US006971244B2

(12) United States Patent
Domyo

(10) Patent No.: US 6,971,244 B2
(45) Date of Patent: Dec. 6, 2005

(54) REFRIGERATOR

(75) Inventor: Nobuo Domyo, Osaka (JP)

(73) Assignee: Daikin Industries, Ltd., Osaka (JP)

( * ) Notice: Subject to any disclaimer, the term of this patent is extended or adjusted under 35 U.S.C. 154(b) by 0 days.

(21) Appl. No.: 10/257,919

(22) PCT Filed: Mar. 30, 2001

(86) PCT No.: PCT/JP01/02837

§ 371 (c)(1),
(2), (4) Date: Oct. 18, 2002

(87) PCT Pub. No.: WO01/79767

PCT Pub. Date: Oct. 25, 2001

(65) Prior Publication Data

US 2003/0167780 A1 Sep. 11, 2003

(30) Foreign Application Priority Data

Apr. 19, 2000 (JP) ............................ 2000-118225

(51) Int. Cl.[7] ............................................... F25B 41/00
(52) U.S. Cl. ................................ 62/114; 62/84; 62/292
(58) Field of Search ............................ 62/84, 114, 149, 62/292, 502

(56) References Cited

U.S. PATENT DOCUMENTS 5,295,357 A * 3/1994 Kaneko ......................... 62/84
5,554,311 A * 9/1996 Katafuchi et al. ............ 252/68
6,477,848 B1 * 11/2002 Domyo et al. ................ 62/114

FOREIGN PATENT DOCUMENTS

| | | |
|---|---|---|
| JP | 8-135572 A | 5/1996 |
| JP | 9-151370 A | 6/1997 |
| JP | 9-208939 A | 8/1997 |
| WO | WO 98/41803 | 9/1998 |

OTHER PUBLICATIONS

Shadan Hojin Nippon Reitou Kyokai Ed., "Jyokyu Hyojun Text Reitou Kucho Gijutsu", Jan. 20, 1988, p. 133, Right Column, Line 8 to p. 143, Right Column, Line 26.

* cited by examiner

*Primary Examiner*—Melvin Jones
(74) *Attorney, Agent, or Firm*—Nixon Peabody LLP; Donald R. Studebaker

(57) ABSTRACT

A refrigerant circuit (10) is formed by connecting, in the order given, a compressor (11), a four-way selector valve (12), an outdoor heat exchanger (13), an expansion valve (14), and an indoor heat exchanger (15) by a gas side pipe (31) and a liquid side pipe (32). The refrigerant circuit (10) is charged with a single refrigerant of R32 or with an R32/R125 mixed refrigerant whose R32 content is not less than 75% by weight. As a refrigeration oil, a synthetic oil is used, and such a refrigeration oil has an addition of an extreme pressure additive. When cooling rated capacity is not more than 5 kW, the liquid side pipe (32) is formed by use of a pipe whose inside diameter is less than 4.75 mm.

27 Claims, 6 Drawing Sheets

Fig. 3

| | R22 | R407C | R410A | R134a | R32/125(75/25wt%) | R32 |
|---|---|---|---|---|---|---|
| ΔT (℃) | 5 | 5 | 5 | 5 | 5 | 5 |
| ΔP (kPa) | 86.13 | 85.86 | 135.05 | 56.92 | 138.66 | 138.49 |
| ΔT/ΔP (℃/kPa) | 0.58 | 0.58 | 0.37 | 0.88 | 0.36 | 0.36 |
| Δh (kJ/kg) | 154.39 | 157.07 | 154.82 | 142.13 | 195.72 | 238.79 |
| ρs (kg/m³) | 22.04 | 21.98 | 31.44 | 15.05 | 26.61 | 22.68 |
| HEAT TRANSFER PIPE INSIDE DIAMETER RATIO | 1.00 | 0.99 | 0.85 | 1.21 | 0.80 | 0.76 |

Fig. 6

| | R22 | R407C | R410A | R134a | R32/125(75/25wt%) | R32 |
|---|---|---|---|---|---|---|
| HP (kPa) | 1899.1 | 2061.1 | 2996.9 | 1285.8 | 3072.32 | 3068.9 |
| LP (kPa) | 531.14 | 529.71 | 851.71 | 314.63 | 867.93 | 866.52 |
| Δh (kJ/kg) | 154.39 | 157.07 | 154.82 | 142.13 | 195.72 | 238.79 |
| ρs (kg/m$^3$) | 22.04 | 21.98 | 31.44 | 15.05 | 26.61 | 22.68 |
| PIPE INSIDE DIAMETER RATIO | 1.00 | 0.97 | 0.85 | 1.19 | 0.80 | 0.76 |

| REFRIGERANT | GWP |
|---|---|
| R22 | 1500 |
| R407C | 1530 |
| R410A | 1730 |
| R134a | 1300 |
| R32 | 650 |

REFRIGERATOR

TECHNICAL FIELD

The present invention relates to refrigeration systems. More particularly, this invention relates to a refrigeration system which employs either a single refrigerant of R32 or an R32 containing mixed refrigerant.

BACKGROUND ART

A conventional refrigeration system has been known which comprises a refrigerant circuit including a compressor, a condenser, a pressure reducing mechanism, and an evaporator and the refrigerant circuit forms a refrigeration cycle in which an HCFC refrigerant such as R22 is used. Of these element devices of the refrigerant circuit, the compressor plays an important role of increasing the pressure of the refrigerant. Therefore, refrigeration oil is required for smooth operation of the compressor.

On the other hand, refrigeration systems employing an HFC refrigerant use a synthetic oil as a refrigeration oil.

PROBLEMS THAT THE INVENTION INTENDS TO SOLVE

In refrigeration systems of the aforesaid type, their refrigeration oil often has an addition of an extreme pressure additive. However, such an extreme pressure additive is hydrolyzed when the sliding surface of the compressor enters the high temperature state and when existing together with moisture, and there is a drop in the lubricity. Further, deteriorated substances hydrolyzed will not dissolve into the refrigerant, therefore being deposited in the form of a sludge in an expansion valve or in a capillary tube. This may cause clogging of the refrigerant circuit flowpath.

Further, extreme pressure additives of the chlorine family may produce a corrosive substance such as hydrochloric acid when hydrolyzed.

Contamination with air and moisture occurs at the time of the manufacture of the element devices of the refrigerant circuit and at the time of installation in the field. Therefore, the amount of such contamination can be reduced by making a change in the manufacture method and process and by reinforcement in product quality control at the time of manufacture. On the other hand, during the installation, it is necessary to take some measures for achieving improvements in the degree of ultimate vacuum when drawing vacuum, for extending the length of time taken to draw vacuum, and for providing improvements in vacuum pump performance.

Therefore, with respect to refrigeration systems using a refrigeration oil having an addition of an extreme pressure additive, there is the demand for further improvements in system reliability as well as in system handling ease.

Bearing in mind the aforementioned problems, the present invention was made. Accordingly, an object of the present invention is to provide improvements in system reliability as well as in system handling ease.

DISCLOSURE OF THE INVENTION

With a view to achieving the aforesaid object, the present invention utilizes a resin material as an insulating material for use in an electric motor of the compressor and employs a refrigerant of less pressure loss (e.g., an R32 single refrigerant or R32 mixed refrigerant) in comparison with the R22 or other refrigerants.

The present invention was made based on the following facts. That is, by reason of the fact that the R32 single refrigerant (or the R32 mixed refrigerant) provides a greater refrigeration effect in comparison with R22, R407C, and R410A, less amounts of circulating refrigerant necessary for obtaining the same capacity are required in comparison with the R22 and other refrigerants. Therefore, for the case of the R32 single refrigerant (or the R32 mixed refrigerant), its comparison with, for example, the R22, when flowing through a flowpath of the same diameter.

The refrigerant pipe includes a liquid side pipe. The liquid side pipe is a pipe extending, for example, from a condenser outlet to an evaporator inlet. The liquid side pipe does not cause a drop in the system performance even when there is an increase in the pressure loss, as long as that increase falls within the control range of the pressure reducing mechanism (for example a capillary tube and an expansion valve). Further, when employing an R32 single refrigerant or an R32 mixed refrigerant, the high-low pressure difference in the refrigerant circuit is, at most, about 1.6 times greater than when the R22 refrigerant is employed. Correspondingly, the allowable range for refrigerant pressure loss extends. Accordingly, when the R32 single refrigerant (or the R32 mixed refrigerant) is employed, it is possible to further reduce the diameter of the liquid side pipe than conventional, without a drop in the system performance.

On the other hand, the refrigerant pipe further includes a discharge pipe and a suction pipe. The discharge pipe is a pipe extending, for example, from a compressor discharge side and a condenser inlet, whereas the suction pipe is a pipe extending, for example, from an evaporator outlet and a compressor suction side. The pressure loss of these discharge and suction pipes considerably affects the system performance. However, the utilization of the R32 single refrigerant (or the R32 mixed refrigerant) decreases the pressure loss to a further extent than conventional. This shows that, even when the diameter of the discharge and suction pipes is reduced, the utilization of an R32 single refrigerant (or an R32 mixed refrigerant) makes it possible to maintain the same system performance as conventional. Furthermore, the R32 single refrigerant (or the R32 mixed refrigerant) makes it possible to reduce the pipe diameter to some extent while maintaining superiority in performance to conventional systems.

Further, as a factor which affects the performance of a heat exchanger, saturation temperature difference equivalent to the amount of refrigerant pressure loss becomes important. For the case of the R32 single refrigerant (or the R32 mixed refrigerant), the pressure loss is small. Therefore, even when the diameter of a heat transfer pipe of the heat exchanger is reduced, the saturation temperature difference can become the same as conventional. Furthermore, both the R32 single refrigerant and the R32 mixed refrigerant have a higher heat transfer rate than conventional. Therefore, even when a heat transfer pipe has a reduction in diameter, it is able to maintain the heat exchanging capacity at high levels.

From the above, the inventor of the present invention found out that, even when an R32 single refrigerant (or an R32 mixed refrigerant) is employed to reduce the diameter of a refrigerant pipe and the diameter of a heat exchanger heat transfer pipe for reducing the internal volume of a refrigerant circuit, there occurs no problem with the system performance at all. On the other hand, the amount of air or moisture contamination in a refrigerant circuit increases in proportion to the internal volume of a refrigerant circuit. Therefore, in accordance with the present invention, the internal volume of a refrigerant circuit is reduced by utilization of an R32 single refrigerant (or an R32 mixed refrigerant) so that the amount of air or moisture contamination which is introduced into the refrigerant circuit can be reduced for preventing deterioration of an extreme pressure additive.

In refrigeration systems, their refrigeration oil often has an addition of an extreme pressure additive. In other words, an extreme pressure additive is added to a refrigerant oil for preventing abrasion and seizing when the sliding part of the compressor enters the high-temperature, high-pressure state.

Particularly, since HFC refrigerants contain no chlorine atom, neither CFC refrigerants nor HCFC refrigerants exhibit an effective extreme pressure action. The extreme pressure action is an action in which chlorine atoms in the refrigerant react with iron in the sliding part of the compressor to form an extreme pressure coating. For the case of the HFC refrigerants, no extreme pressure coating is formed.

Accordingly, for the case of HFC refrigerants, the necessity for an extreme pressure additive is great. As an extreme pressure additive, extreme pressure additives of the phosphorus family such as phosphoric ester and phosphite may be used. Other than these phosphorus family extreme pressure additives, extreme pressure additives of the chlorine family and extreme pressure additives of the sulfur family may be used.

On the other hand, a refrigerant circuit may be contaminated with air or moisture at the time of manufacture of element devices of the refrigerant circuit and at the time of installation of a system in the installation field.

The extreme pressure additive is hydrolyzed when the temperature of a sliding surface of the compressor is high and when existing together with moisture, and there is a drop in the lubricity. Further, deteriorated substances hydrolyzed will not dissolve into the refrigerant, therefore being deposited in the form of a sludge in an expansion valve or in a capillary tube. This may cause clogging of the refrigerant circuit flowpath.

Further, extreme pressure additives of the chlorine family may produce a corrosive substance such as hydrochloric acid when hydrolyzed.

Therefore, as described above, in the present invention a R32 single refrigerant (or an R32 mixed refrigerant) is employed to reduce the internal volume of a refrigerant circuit. Because of this, the amount of air or moisture contamination in the refrigerant circuit can be reduced. By virtue of such a reduction in the amount of air or moisture contamination, the hydrolysis of an extreme pressure additive is prevented for deterioration prevention.

More specifically, in accordance with an invention of the present application, either a single refrigerant of R32 or a mixed refrigerant whose R32 content is not less than 75% is employed and a refrigeration oil having an addition of an extreme pressure additive is utilized.

Another invention is directed to a refrigeration system whose cooling rated capacity is not more than 5 kW, the refrigeration system comprising a refrigerant circuit (10) which forms a refrigeration cycle in which either a single refrigerant of R32 or a mixed refrigerant whose R32 content is not less than 75% is used as a refrigerant and includes a compressor (11) which utilizes a refrigeration oil having an addition of an extreme pressure additive. And, the refrigerant circuit (10) includes a liquid side pipe (32) which is formed by use of a pipe whose inside diameter is less than 4.75 mm.

Still another invention is directed to a refrigeration system whose cooling rated capacity is not more than 5 kW, the refrigeration system comprising a refrigerant circuit (10) which forms a refrigeration cycle in which either a single refrigerant of R32 or a mixed refrigerant whose R32 content is not less than 75% is used as a refrigerant and includes a compressor (11) which utilizes a refrigeration oil having an addition of an extreme pressure additive. And, the refrigerant circuit (10) includes a liquid side pipe (32) which is formed by use of a pipe whose inside diameter ranges from 3.2 mm to 4.2 mm.

A further invention is directed to a refrigeration system whose cooling rated capacity is not more than 5 kW, the refrigeration system comprising a refrigerant circuit (10) which forms a refrigeration cycle in which either a single refrigerant of R32 or a mixed refrigerant whose R32 content is not less than 75% is used as a refrigerant and includes a compressor (11) which utilizes a refrigeration oil having an addition of an extreme pressure additive. And, the refrigerant circuit (10) includes a liquid side pipe (32) which is formed by use of a pipe whose inside diameter ranges from 3.5 mm to 3.9 mm.

A still further invention is directed to a refrigeration system whose cooling rated capacity is not more than 5 kW, the refrigeration system comprising a refrigerant circuit (10) which forms a refrigeration cycle in which either a single refrigerant of R32 or a mixed refrigerant whose R32 content is not less than 75% is used as a refrigerant and includes a compressor (11) which utilizes a refrigeration oil having an addition of an extreme pressure additive. And, the refrigerant circuit (10) includes a liquid side pipe (32) which is formed by use of a pipe whose inside diameter ranges from 3.6 mm to 3.8 mm.

Another invention is directed to a refrigeration system whose cooling rated capacity is greater than 5 kW but not more than 18 kW, the refrigeration system comprising a refrigerant circuit (10) which forms a refrigeration cycle in which either a single refrigerant of R32 or a mixed refrigerant whose R32 content is not less than 75% is used as a refrigerant and includes a compressor (11) which utilizes a refrigeration oil having an addition of an extreme pressure additive. And, the refrigerant circuit (10) includes a liquid side pipe (32) which is formed by use of a pipe whose inside diameter is less than 7.92 mm.

Still another invention is directed to a refrigeration system whose cooling rated capacity is greater than 18 kW but not more than 22.4 kW, the refrigeration system comprising a refrigerant circuit (10) which forms a refrigeration cycle in which either a single refrigerant of R32 or a mixed refrigerant whose R32 content is not less than 75% is used as a refrigerant and includes a compressor (11) which utilizes a refrigeration oil having an addition of an extreme pressure additive. And, the refrigerant circuit (10) includes a liquid side pipe (32) which is formed by use of a pipe whose inside diameter is less than 11.1 mm.

A further invention is directed to a refrigeration system whose cooling rated capacity is greater than 5 kW but not more than 22.4 kW, the refrigeration system comprising a refrigerant circuit (10) which forms a refrigeration cycle in which either a single refrigerant of R32 or a mixed refrigerant whose R32 content is not less than 75% is used as a refrigerant and includes a compressor (11) which utilizes a refrigeration oil having an addition of an extreme pressure additive. And, the refrigerant circuit (10) includes a liquid side pipe (32) which is formed by use of a pipe whose inside diameter ranges from 5.4 mm to 7.0 mm.

A still further invention is directed to a refrigeration system whose cooling rated capacity is greater than 5 kW but not more than 22.4 kW, the refrigeration system comprising a refrigerant circuit (10) which forms a refrigeration cycle in which either a single refrigerant of R32 or a mixed refrigerant whose R32 content is not less than 75% is used as a refrigerant and includes a compressor (11) which utilizes a refrigeration oil having an addition of an extreme pressure additive. And, the refrigerant circuit (10) includes a liquid side pipe (32) which is formed by use of a pipe whose inside diameter ranges from 5.7 mm to 6.7 mm.

Another invention is directed to a refrigeration system whose cooling rated capacity is greater than 5 kW but not more than 22.4 kW, the refrigeration system comprising a refrigerant circuit (10) which forms a refrigeration cycle in which either a single refrigerant of R32 or a mixed refrigerant whose R32 content is not less than 75% is used as a refrigerant and includes a compressor (11) which utilizes a refrigeration oil having an addition of an extreme pressure additive. And, the refrigerant circuit (10) includes a liquid side pipe (32) which is formed by use of a pipe whose inside diameter ranges from 6.0 mm to 6.4 mm.

Still another invention is directed to a refrigeration system whose cooling rated capacity is so designed as to be greater than 22.4 kW, the refrigeration system comprising a refrigerant circuit (10) which forms a refrigeration cycle in which either a single refrigerant of R32 or a mixed refrigerant whose R32 content is not less than 75% is used as a refrigerant and includes a compressor (11) which utilizes a refrigeration oil having an addition of an extreme pressure additive. And, the refrigerant circuit (10) includes a liquid side pipe (32) which is formed by use of a pipe whose inside diameter is less than 13.88 mm.

A further invention is directed to a refrigeration system whose cooling rated capacity is so designed as to be greater than 22.4 kW, the refrigeration system comprising a refrigerant circuit (10) which forms a refrigeration cycle in which either a single refrigerant of R32 or a mixed refrigerant whose R32 content is not less than 75% is used as a refrigerant and includes a compressor (11) which utilizes a refrigeration oil having an addition of an extreme pressure additive. And, the refrigerant circuit (10) includes a liquid side pipe (32) which is formed by use of a pipe whose inside diameter ranges from 7.5 mm to 9.8 mm.

A still further invention is directed to a refrigeration system whose cooling rated capacity is so designed as to be greater than 22.4 kW, the refrigeration system comprising a refrigerant circuit (10) which forms a refrigeration cycle in which either a single refrigerant of R32 or a mixed refrigerant whose R32 content is not less than 75% is used as a refrigerant and includes a compressor (11) which utilizes a refrigeration oil having an addition of an extreme pressure additive. And, the refrigerant circuit (10) includes a liquid side pipe (32) which is formed by use of a pipe whose inside diameter ranges from 7.8 mm to 9.5 mm.

Another invention is directed to a refrigeration system whose cooling rated capacity is so designed as to be greater than 22.4 kW, the refrigeration system comprising a refrigerant circuit (10) which forms a refrigeration cycle in which either a single refrigerant of R32 or a mixed refrigerant whose R32 content is not less than 75% is used as a refrigerant and includes a compressor (11) which utilizes a refrigeration oil having an addition of an extreme pressure additive. And, the refrigerant circuit (10) includes a liquid side pipe (32) which is formed by use of a pipe whose inside diameter ranges from 8.1 mm to 9.1 mm.

Still another invention is directed to a refrigeration system whose cooling rated capacity is not more than 3.2 kW, the refrigeration system comprising a refrigerant circuit (10) which forms a refrigeration cycle in which either a single refrigerant of R32 or a mixed refrigerant whose R32 content is not and includes a compressor (11) which utilizes a refrigeration oil having an addition of an extreme pressure additive. And, the refrigerant circuit (10) includes a gas side pipe (31) which is formed by use of a pipe whose inside diameter is less than 7.92 mm.

A further invention is directed to a refrigeration system whose cooling rated capacity is greater than 3.2 kW but not more than 5 kW, the refrigeration system comprising a refrigerant circuit (10) which forms a refrigeration cycle in which either a single refrigerant of R32 or a mixed refrigerant whose R32 content is not less than 75% is used as a refrigerant and includes a compressor (11) which utilizes a refrigeration oil having an addition of an extreme pressure additive. And, the refrigerant circuit (10) includes a gas side pipe (31) which is formed by use of a pipe whose inside diameter is less than 11.1 mm.

A still further invention is directed to a refrigeration system whose cooling rated capacity is greater than 5 kW but not more than 9 kW, the refrigeration system comprising a refrigerant circuit (10) which forms a refrigeration cycle in which either a single refrigerant of R32 or a mixed refrigerant whose R32 content is not less than 75% is used as a refrigerant and includes a compressor (11) which utilizes a refrigeration oil having an addition of an extreme pressure additive. And, the refrigerant circuit (10) includes a gas side pipe (31) which is formed by use of a pipe whose inside diameter is less than 13.88 mm.

Another invention is directed to a refrigeration system whose cooling rated capacity is greater than 9 kW but not more than 18 kW, the refrigeration system comprising a refrigerant circuit (10) which forms a refrigeration cycle in which either a single refrigerant of R32 or a mixed refrigerant whose R32 content is not less than 75% is used as a refrigerant and includes a compressor (11) which utilizes a refrigeration oil having an addition of an extreme pressure additive. And, the refrigerant circuit (10) includes a gas side pipe (31) which is formed by use of a pipe whose inside diameter is less than 17.05 mm.

Still another invention is directed to a refrigeration system whose cooling rated capacity is greater than 18 kW but not more than 22.4 kW, the refrigeration system comprising a refrigerant circuit (10) which forms a refrigeration cycle in which either a single refrigerant of R32 or a mixed refrigerant whose R32 content is not less than 75% is used as a refrigerant and includes a compressor (11) which utilizes a refrigeration oil having an addition of an extreme pressure additive. And, the refrigerant circuit (10) includes a gas side pipe (31) which is formed by use of a pipe whose inside diameter is less than 23.4 mm.

A further invention is directed to a refrigeration system whose cooling rated capacity is so designed as to be greater than 22.4 kW, the refrigeration system comprising a refrigerant circuit (10) which forms a refrigeration cycle in which either a single refrigerant of R32 or a mixed refrigerant whose R32 content is not less than 75% is used as a refrigerant and includes a compressor (11) which utilizes a refrigeration oil having an addition of an extreme pressure additive. And, the refrigerant circuit (10) includes a gas side pipe (31) which is formed by use of a pipe whose inside diameter is less than 26.18 mm.

A still further invention is directed to a refrigeration system comprising a refrigerant circuit (10) which includes (a) a compressor (11) which utilizes a refrigeration oil having an addition of an extreme pressure additive and (b) an indoor heat exchanger (15) and forms a refrigeration cycle in which either a single refrigerant of R32 or a mixed refrigerant whose R32 content is not less than 75% is used as a refrigerant. And, the indoor heat exchanger (15) includes a heat transfer pipe which is formed by use of a heat transfer pipe whose inside diameter is less than 5.87 mm.

Another invention is directed to a refrigeration system comprising a refrigerant circuit (10) which includes (a) a compressor (11) which utilizes a refrigeration oil having an addition of an extreme pressure additive and (b) an outdoor heat exchanger (13) and forms a refrigeration cycle in which either a single refrigerant of R32 or a mixed refrigerant whose R32 content is not less than 75% is used as a refrigerant. And, the outdoor heat exchanger (13) includes a heat transfer pipe which is formed by use of a heat transfer pipe whose inside diameter is less than 6.89 mm.

Still another invention is directed to a refrigeration system comprising a refrigerant circuit (10) which includes (a) a compressor (11) which utilizes a refrigeration oil having an addition of an extreme pressure additive and (b) an outdoor heat exchanger (13) and forms a refrigeration cycle in which either a single refrigerant of R32 or a mixed refrigerant whose R32 content is not less than 75% is used as a refrigerant. And, the outdoor heat exchanger (13) includes a heat transfer pipe which is formed by use of a heat transfer pipe whose inside diameter is less than 7.99 mm.

Further, the compressor (11) may use a synthetic oil as a refrigeration oil.

Furthermore, the liquid side pipe (32) may be a liquid side connecting pipe for connecting an indoor unit (17) and an outdoor unit (16).

Further, the gas side pipe (31) may be a gas side connecting pipe for connecting an indoor unit (17) and an outdoor unit (16).

Preferably, the mixed refrigerant is an R32/R125 mixed refrigerant.

Finally, the refrigerant may be a single refrigerant of R32.

EFFECTS OF THE INVENTION

Therefore, the present invention makes it possible to reduce the internal volume of the refrigerant circuit (10), thereby making it possible to reduce the amount of air contamination, moisture contamination, or other contamination which is introduced into the refrigerant circuit (10). As a result, the hydrolysis of an extreme pressure additive which is added to the refrigerant can be prevented, and it is possible to prevent the drop in lubricity. Particularly, since deteriorated substances hydrolyzed will not deposit in the form of a sludge in an expansion valve or in a capillary tube, this prevents clogging of the flowpath of the refrigerant circuit (10), without fail.

Further, it is possible to prevent the generation of a corrosive substance such as hydrochloric acid in an extreme pressure additive of the chlorine family.

Further, it is possible to prevent insulating materials used in the electric motor in the compressor (11) from undergoing deterioration. Therefore, burning out of the electric motor can be prevented and, in addition, a sliding portion of the compressor (11) is prevented from undergoing abrasion and seizing. Further, the expansion mechanism (14) such as a capillary tube can be prevented from clogging or the like. Accordingly, it is possible to achieve the reduction in fraction defective.

Furthermore, since the possibility that the refrigerant circuit (10) is contaminated with air or other contaminants is small, this facilitates manufacture and install control, thereby making it possible to provide improvements in manufacture ease and installation ease.

Further, the use of a synthetic oil as a refrigeration oil makes it possible to provide improvements in system reliability.

BRIEF DESCRIPTION OF THE DRAWINGS

FIG. 3 is a table showing calculation results for the heat transfer pipe's inside diameter ratio.

FIG. 6 is a table showing calculation results for the liquid side pipe's inside diameter ratio.

BEST MODE FOR CARRYING OUT THE INVENTION

Hereinafter, embodiments of the present invention will be descried in greater detail in conjunction with the Figures.

Construction of the Air Conditioning System

Figure 1:
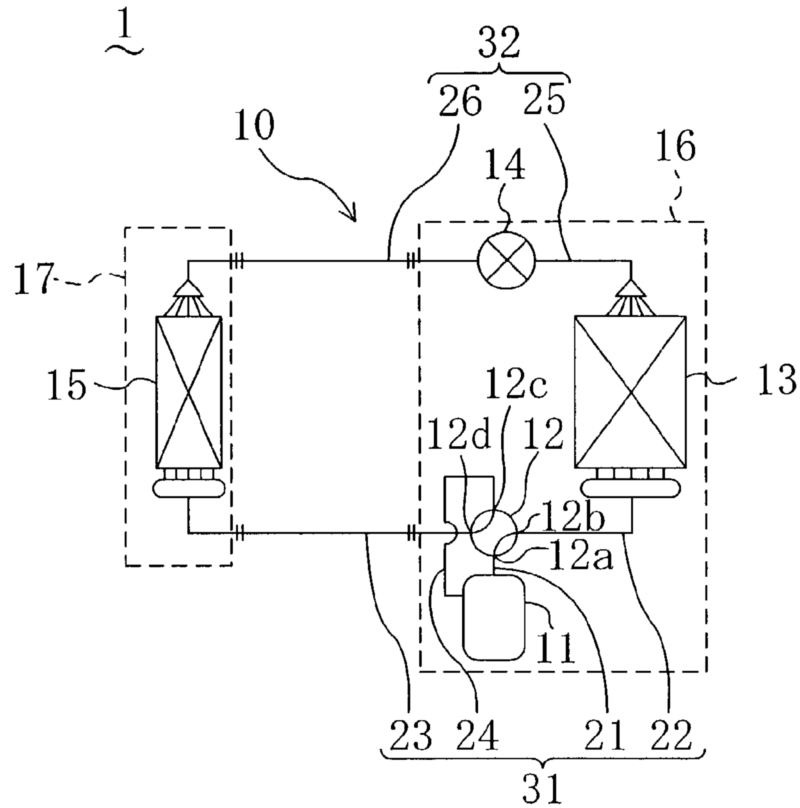
FIG. 1 is a refrigerant circuit diagram of an air conditioning system.

As seen in FIG. 1, a refrigeration system of the present embodiment is an air conditioning system (1) formed by connection of an outdoor unit (16) which is a heat source unit and an indoor unit (17) which is a utilization unit. A refrigerant circuit (10) of the air conditioning system (1) employs, as its refrigerant, either a single refrigerant of R32 (hereinafter referred to as the R32 single refrigerant) or a mixed refrigerant comprising R32 and R125 in which its R32 content is not less than 75% but less than 100% by weight (i.e., an R32 composition rich mixed refrigerant which is hereinafter called the R32/R125 mixed refrigerant).

The refrigerant circuit (10) is a refrigerant circuit which forms a vapor compression refrigeration cycle. The refrigerant circuit (10) is formed by connecting, in series in the order given, a compressor (11), a four-way selector valve (12), an outdoor heat exchanger (13) which is a heat source side heat exchanger, an expansion valve (14) which is an expansion mechanism, and an indoor heat exchanger (15) which is a utilization side heat exchanger, by a gas side pipe (31) and a liquid side pipe (32). These pipes (31) and (32) are refrigerant pipes.

More specifically, a discharge side of the compressor (11) and a first port (12*a*) of the four-way selector valve (12) are connected together by a first gas side pipe (21). A second port (12*b*) of the four-way selector valve (12) and the outdoor heat exchanger (13) are connected together by a second gas side pipe (22). The outdoor heat exchanger (13) and the expansion valve (14) are connected together by a first liquid side pipe (25). The expansion valve (14) and the indoor heat exchanger (15) are connected together by a second liquid side pipe (26). The indoor heat exchanger (15) and a third port (12*c*) of the four-way selector valve (12) are connected together by a third gas side pipe (23). A fourth port (12*d*) of the four-way selector valve (12) and a suction side of the compressor (11) are connected together by a fourth gas side pipe (24).

The compressor (11), the first gas side pipe (21), the four-way selector valve (12), the second gas side pipe (22), the outdoor heat exchanger (13), the first liquid side pipe (25), the expansion valve (14), and the fourth gas side pipe (24) are all housed in an outdoor unit (16), together with an outdoor air blower (not shown). On the other hand, the indoor heat exchanger (15) is housed in an indoor unit (17), together with an indoor air blower (not shown). A part of the second liquid side pipe (26) and a part of the third gas side pipe (23) constitute a so-called connecting pipe for establishing connection between the outdoor unit (16) and the indoor unit (17).

In the compressor (11), a synthetic oil is used as a refrigeration oil. Such a synthetic oil comprises ether oil, ester oil, or the like. Other than these synthetic oils, alkylbenzene oil may be used.

Further, the refrigeration oil has an addition of an extreme pressure additive. As an extreme pressure additive, additives of the phosphorus family such as phosphoric ester and phosphite may be used. Other than these phosphorus family additives, additives of the chlorine family and additives of the sulfur family may be used.

On the other hand, an electric motor (not shown) of the compressor (11) is housed in the casing. In the electric motor, insulating material such as insulating paper, a lead wire, a tying cord and the like is used. Such an insulating material comprises a resin material. And, the insulating material comprises polyethylene terephthalate (PET), polyethylene naphthalate (PEN), polyphenylene sulfide (PPS), polybutylene terephthalate (PBT), polyether ether ketone (PEEK), polyamide imide (PAI), polyimide, or the like.

That is, the insulating paper, the lead wire, and the typing cord are formed by use of these resin materials. For example, the insulating paper may be formed of PET and the lead wire may be formed of PPS, and plural types of resin materials may be utilized in the compressor electric motor.

Ether oil and alkylbenzene oil are susceptible to oxidative deterioration by air. Ester oil is hydrolyzed by moisture contamination. As a result, the total acid number of any of the synthetic oils increases.

Any of these resin materials undergoes a drop in strength such as a drop in tensile strength during the rise in total acid number. This may give rise to burning out of the electric motor in the worst case.

Further, for the case of PET, PEN, and PBT, their molecules contain therein ester bonds. Because of this, when existing together with moisture, these resin materials cause hydrolysis when the temperature rises by refrigeration operations. As a result, the deterioration of the resin materials will be aggravated.

On the other hand, the refrigeration oil has an addition of an extreme pressure additive for the prevention of abrasion and seizing of a sliding part of the compressor (11). Particularly, since refrigerants of the HFC family such as R32 contain no chlorine atom, there is exhibited no extreme pressure action. Therefore, an extreme pressure additive is added to the refrigeration oil.

Such an extreme pressure additive is hydrolyzed when the temperature of the sliding surface of the compressor (11) becomes high and when existing together with moisture and, as a result, there is a drop in the lubricity. As a result, the extreme pressure additive may be deposited in the form of a sludge in the expansion valve (14). Further, chlorine-family extreme pressure additives may produce a corrosive substance.

Therefore, as will be described later, an R32 single refrigerant (or an R32/R125 mixed refrigerant) is used to diminish the internal volume of the refrigerant circuit (10), for reducing the amount of air or moisture contamination.

Construction of the Heat Exchanger

Since R32 single refrigerant (or R32/R125 mixed refrigerant) exhibits a greater refrigeration effect per unit volume than the R22, the former requires a less amount of circulating refrigerant for achieving a specified capacity in comparison with the later. Therefore, for the case of the R32 single refrigerant (or the R32/R125 mixed refrigerant), the amount of circulating refrigerant can be reduced, provided that heat exchanger's heat transfer pipes of the same inside diameter are used. As a result, the loss of tube pressure becomes smaller in comparison with the R22.

Generally, if the inside diameter of a heat transfer pipe of the heat exchanger is made smaller, this results in a decrease in the heat transfer area and in an increase in the refrigerant pressure loss, thereby causing a drop in the total system performance. However, when using an R32 single refrigerant (or an R32/R125 mixed refrigerant), its refrigerant side heat transfer rate in the heat transfer pipe is larger than that of R22, so that it is possible to achieve the same total performance as R22 or a better total performance than R22, even when the loss of tube pressure is increased up to about an R22 equivalent level.

On the other hand, of all the devices of the refrigerant circuit (10), it is the outdoor heat exchanger (13) which holds a largest amount of refrigerant. Accordingly, if the diameter of the heat transfer pipe of the outdoor heat exchanger (13) can be reduced, this makes it possible to effectively reduce the amount of charging refrigerant. Further, such a reduction in the heat transfer pipe diameter results in a decrease in the internal volume of the refrigerant circuit (10). Furthermore, by virtue of the reduction of the heat transfer pipe diameter, both the outdoor heat exchanger (13) and the indoor heat exchanger (15) become smaller in size, thereby making it possible to promote the compacting of both the outdoor unit (16) and the indoor unit (17).

Therefore, in the air conditioning system (1) of the present invention, the diameter of the heat transfer pipes of the outdoor heat exchanger (13) and indoor heat exchanger (15) is reduced to such an extent that the loss of tube pressure is at the same level as the R22. More specifically, in the air conditioning system (1) of the present invention, the amount of variation in the refrigerant saturation temperature corresponding to the amount of pressure loss in the heat transfer pipe is taken into account and the inside diameter dimension of the outdoor heat exchanger (13) and indoor heat exchanger (15) is set so that the temperature variation amount becomes the same as that of the R22.

Basic Principle of Construction of the Heat Transfer Pipe

Next, a basic principle of constituting heat transfer pipes for the outdoor and indoor heat exchangers (13) and (15) will be described in detail.

Figure 2:
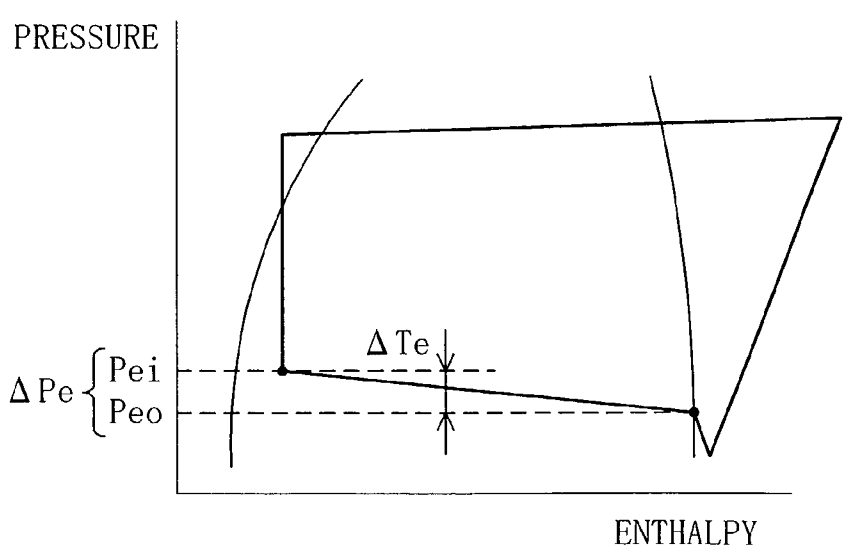
FIG. 2 is a Mollier diagram.

Here, as shown in FIG. 2, each heat transfer pipe for the outdoor and indoor heat exchangers (13) and (15) is set such that the saturation temperature variation $\Delta Te$ corresponding to the pressure loss of evaporation refrigerant becomes the same as that of R22 in a conventional system. That is, $$\Delta Te = \text{Const.} \quad (1)$$

Here, $\Delta P$: pipe pressure loss (kPa)

L: pipe length (m)

G: refrigerant circulation amount (kg/s)

A: flowpath cross-sectional area ($m^2$)

$\lambda$: loss coefficient d: pipe inside diameter (m)

$\rho s$: compressor suction refrigerant density ($kg/m^3$)

And, the saturation temperature variation $\Delta Te$ is given by the following expression.

$$\Delta Te=\{\Delta T/\Delta P\}\times\Delta Pe \tag{2}$$

The pressure loss $\Delta P$ is calculated using the following expression which is a friction loss expression for annular pipes.

$$\Delta P=\lambda\cdot L/d\cdot G^2/2\cdot\rho s\cdot A^2 \tag{3}$$

If the cooling capacity $Q=G\times\Delta h$ is constant, then:

$$\Delta P\propto G^2/\rho s\cdot d^5\propto(\Delta h^2\cdot\rho s\cdot d^5)^{-1} \tag{4}$$

where $\Delta h$ is the refrigeration effect (kJ/kg).

Therefore, the following expression is derived from the expressions (2) and (4).

$$\Delta Te\propto\{\Delta T/\Delta P\}\times(\Delta h^2\cdot\rho s\cdot d^5)^{-1} \tag{5}$$

Hence, from the expressions (1) and (5) and from the material property values of R22 and R32, the inside diameter ratio of an R32 heat transfer pipe to an R22 heat transfer pipe, i.e., the heat transfer pipe diameter reducing ratio, can be found by the following expression.

$$\{\Delta T/\Delta P\}_{22}\times(\Delta h_{22}{}^2\cdot\rho s_{22}\cdot d_{22}{}^5)^{-1}=\{\Delta T/\Delta P\}_{32}\times(\Delta h_{32}{}^2\cdot\rho s_{32}\cdot d_{32}{}^5)^{-1}\quad d_{32}/d_{22}=((\Delta h_{32}/\Delta h_{22})^2\times\rho s_{32}/\rho s_{22}\times(\{\Delta T/\Delta P\}_{32}/\{\Delta T/\Delta P\}_{22})^{-1})^{-1/5} \tag{6}$$

Referring to FIG. 3, there are shown results of calculations found by substitution of each material property value into the expression (6). In the calculations, it is assumed that the evaporation temperature Te is 2 degrees Centigrade and the condensation temperature Tc is 49 degrees Centigrade, and the evaporator outlet super heat SH=5 degrees Centigrade and the condenser outlet sub cool SC=5 degrees Centigrade.

The calculation results show that the diameter of the R32 heat transfer pipe can be reduced about 0.76 times that of the R22 heat transfer pipe. Further, the calculation results show that the diameter of the R32/R125 heat transfer pipe can be reduced about from 0.76 to 0.8 times that of the R22 heat transfer pipe. The same calculations were performed on other replacement refrigerants for reference and the calculation results show that none of them achieved better diameter reduction than the R32 (see FIG. 3).

In the air conditioning system (1) of the present embodiment, based upon the aforesaid principle, heat transfer pipes having the following inside diameters are employed, for comparison with the R22 heat transfer pipe.

That is, when an R32 single refrigerant is used, the heat transfer pipe of the indoor heat exchanger (15) is formed by use of a heat transfer pipe whose inside diameter is in the range of 4.7 mm to 5.9 mm, whereas the heat transfer pipe of the outdoor heat exchanger (13) is formed by use of a heat transfer pipe whose inside diameter is in the range of 5.4 mm to 6.7 mm.

On the other hand, when an R32/R125 mixed refrigerant is used, the heat transfer pipe of the indoor heat exchanger (15) is formed by use of a heat transfer pipe whose inside diameter is in the range of 4.7 mm to 6.2 mm, whereas the heat transfer pipe of the outdoor heat exchanger (13) is formed by use of a heat transfer pipe whose inside diameter is in the range of 5.4 mm to 7.1 mm.

If the inside diameter of each heat transfer pipe falls below the numerical value range, the loss of refrigerant pressure excessively increases, although the charging amount of refrigerant is reduced further. On the other hand, the inside diameter of each heat transfer pipe exceeds the numerical value range, the effect of R32 such as the effect of reducing the amount of charging refrigerant is reduced, although the loss of refrigerant pressure decreases and there is improvement in the system efficiency.

Therefore, in order to maintain a balance between them, in the present embodiment the inside diameters of the heat transfer pipes of the outdoor and indoor heat exchangers (13) and (15) are so set as to fall in the aforesaid numerical value ranges.

Of course, there may be made further restrictions on the numerical value ranges for allowing R32 to exhibit its characteristics more significantly, depending upon the system use condition or other conditions.

For example, when an R32 single refrigerant is used, the heat transfer pipe of the indoor heat exchanger (15) may be formed by use of a heat transfer pipe whose inside diameter is in the range of 4.9 mm to 5.7 mm, whereas the heat transfer pipe of the outdoor heat exchanger (13) may be formed by use of a heat transfer pipe whose inside diameter is in the range of 5.6 mm to 6.5 mm.

Further, when an R32 single refrigerant is used, the heat transfer pipe of the indoor heat exchanger (15) may be formed by use of a heat transfer pipe whose inside diameter is in the range of 5.1 mm to 5.5 mm, whereas the heat transfer pipe of the outdoor heat exchanger (13) may be formed by use of a heat transfer pipe whose inside diameter is in the range of 5.8 mm to 6.3 mm.

On the other hand, when an R32/R125 mixed refrigerant is used, the heat transfer pipe of the indoor heat exchanger (15) may be formed by use of a heat transfer pipe whose inside diameter is in the range of 4.9 mm to 6.0 mm, whereas the heat transfer pipe of the outdoor heat exchanger (13) may be formed by use of a heat transfer pipe whose inside diameter is in the range of 5.6 mm to 6.9 mm.

Further, when an R32/R125 mixed refrigerant is used, the heat transfer pipe of the indoor heat exchanger (15) may be formed by use of a heat transfer pipe whose inside diameter is in the range of 5.2 mm to 5.7 mm, whereas the heat transfer pipe of the outdoor heat exchanger (13) may be formed by use of a heat transfer pipe whose inside diameter is in the range of 5.9 mm to 6.6 mm.

Figure 4:
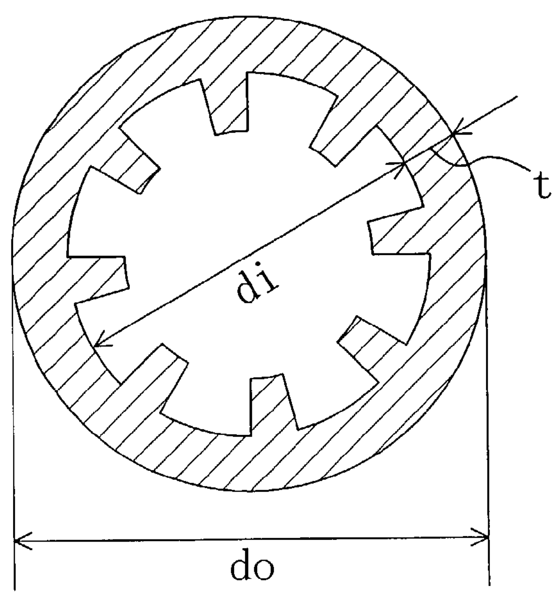
FIG. 4 is a cross-sectional view of a pipe with grooves.

Here, by "the inside diameter of a heat transfer pipe" for the case of internal side smoothed pipes is meant a pipe inside diameter after pipe expansion. Further, as shown in FIG. 4, by "the inside diameter of a heat transfer pipe" for the case of internal side grooved pipes is meant a value which is a remainder of subtracting from the outside diameter after pipe expansion a value which is twice the bottom thickness, i.e., the inside diameter di=do−2t.

Various heat transfer pipes, such as a pipe made of copper or aluminum, are available. The outdoor and indoor heat exchangers (13) and (15) of the present embodiment are each formed by a plate fin tube heat exchanger comprising a copper pipe and an aluminum fin as an air heat exchanger capable of exchanging heat with air. Therefore, their heat transfer pipes are each formed by use of a copper pipe.

Construction of the Refrigerant Pipe

Further, in the air conditioning system (1) of the present embodiment, not only the diameter of the heat transfer pipes of the heat exchangers (13, 15) but also the diameter of the refrigerant pipe of the refrigerant circuit (10) is reduced in order that the internal volume of the refrigerant circuit (10) may be reduced.

As described above, if an R32 single refrigerant (or an R32/R125 mixed refrigerant) is used intact in an existing R22 refrigerant pipe, the loss of refrigerant pressure is reduced. Therefore, even if the inside diameter of the liquid side pipe (32) of the refrigerant circuit (10) is reduced for increasing the loss of tube pressure to the same level as the time that R22 is used, this maintains the system performance at the same level as conventional. Therefore, in the air conditioning system (1), the liquid side pipe (32) has a reduction in diameter to such an extent that the loss of pipe pressure becomes equivalent to that of R22, for reducing the internal volume of the refrigerant circuit (10) while maintaining the system performance.

On the other hand, in the present embodiment, the gas side pipe (31) is the same as a commonly-used R22 gas side pipe. However, in order to provide a reduction in diameter of the gas side pipe (31), it is more preferable that the diameter of the liquid side pipe (32) also be reduced.

Basic Principle of Construction of the Refrigerant Pipe

Next, a basic principle of constructing the liquid side pipe (32) will be described.

Figure 5:
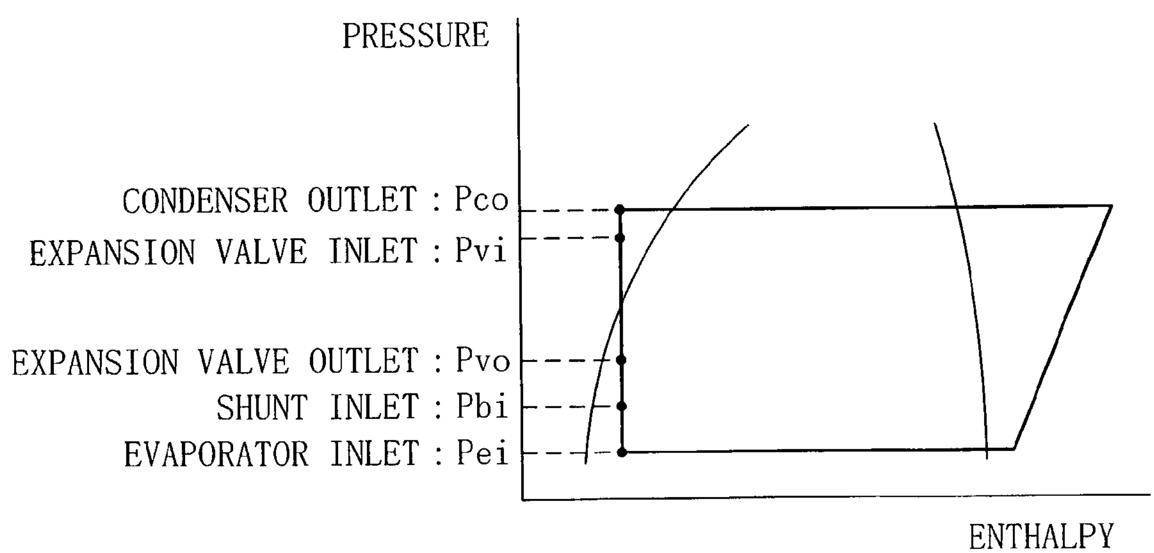
FIG. 5 is another Mollier diagram.

Here, the liquid side pipe (32) is designed such that the ratio of the pressure loss of the liquid side pipe (32) to the amount of drop in the pressure of refrigerant from the condenser outlet to the evaporator inlet is the same as the case of R22. That is, the following expression, in which the signs shown in FIG. 5 are used, holds as follows.

$$(Pco-Pvi)+(Pvo-Pbi)/(Pco-Pei)=Const. \tag{7}$$

where:

ΔP: pipe pressure loss (kPa)

L: pipe length (m)

G: refrigerant circulation amount (kg/s)

A: flowpath cross-sectional area ($m^2$)

λ: loss coefficient d: pipe inside diameter (m)

ρs: compressor suction refrigerant density ($kg/m^3$)

Each term of the numerator of the expression (7) is calculated using the following expression which is a friction loss expression for annular pipes.

$$\Delta P=\lambda\cdot L/d\cdot G^2/2\cdot \rho s\cdot A^2 \tag{8}$$

Here, the capacity Q=G×Δh is constant and the following expression is derived from the expression (8).

$$\Delta P\propto G^2/\rho s\cdot d^5 \neq (\Delta h^2\cdot \rho s\cdot d^5)^{-1} \tag{9}$$

where:

Δh: refrigeration effect (kJ/kg)

Therefore, the following expression is derived.

$$(Pco-Pvi)+(Pvo-Pbi)\propto(\Delta h^2\cdot \rho s\cdot d^5)^{-1} \tag{10}$$

And, the following expression is derived from the expressions (7) and (10).

$$(Pco-Pvi)+(Pvo-Pbi)/(Pco-Pei)\propto(\Delta h^2\cdot \rho s\cdot d^5)^{-1}/(HP-LP) \tag{11}$$

Therefore, from the expressions (7) and (11) and from the material property values of R22 and R32, the heat transfer pipe diameter reducing ratio of an R32 heat transfer pipe to an R22 heat transfer pipe can be found by the following expression.

$$(\Delta h_{22}{}^2\cdot \rho s_{22}\cdot d_{22}{}^5)^{-1}/(HP_{22}-LP_{22})=(\Delta h_{32}{}^2\cdot \rho s_{32}\cdot d_{32}{}^5)^{-1}/(HP_{32-LP32})\quad d_{32}/d_{22}=((\Delta h_{32}/\Delta h_{22})^2\times \rho s_{32}/\rho s_{22}\times(HP_{32}-LP_{32})/(HP_{22-LP22})^{-1/5} \tag{12}$$

Referring to FIG. 6, there are shown results of calculations found by substitution of each material property value into the expression (12). Also in these calculations, the evaporation temperature Te is 2 degrees Centigrade and the condensation temperature Tc is 49 degrees Centigrade, and the super heat SH=5 degrees Centigrade and the sub cool SC=5 degrees Centigrade.

The calculation results show that the diameter of the liquid side pipe (32) of R32 single refrigerant can be reduced about 0.76 times that of an R22 liquid side pipe. Further, the calculation results show that it is possible to reduce the diameter of the liquid side pipe (32) of R32/R125 mixed refrigerant about 0.76–0.8 times that of an R22 liquid side pipe if the R32 content is present in an amount of not less than 75 wt. %. The same calculations were performed on other replacement refrigerants for reference and the calculation results shows that none of them achieved better diameter reduction than the R32 (see FIG. 6).

Figure 7:
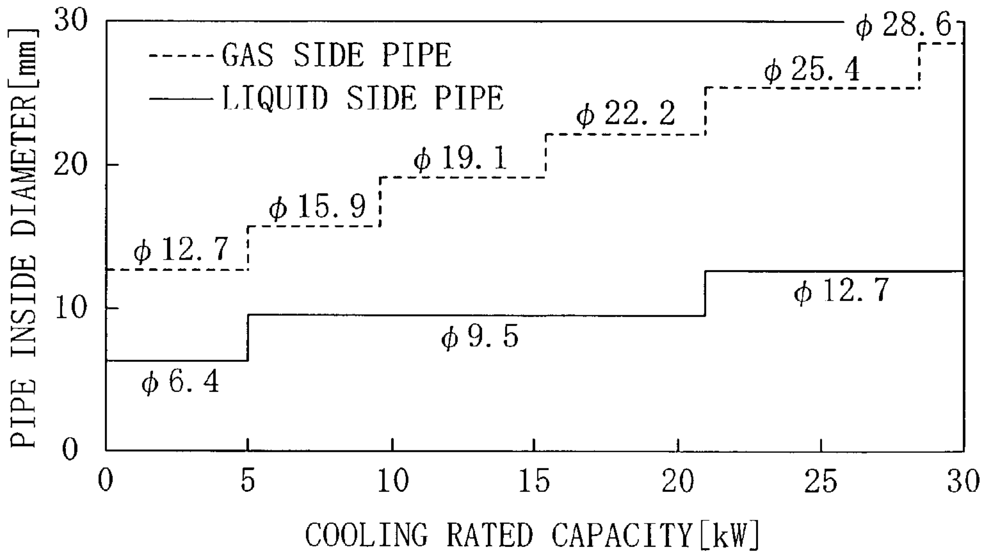
FIG. 7 is a diagram showing R22 gas side pipe diameters and R22 liquid side pipe diameters with respect to the cooling rated capacity.

FIG. 7 is a diagram showing the pipe diameters (inside diameters) of gas side and liquid side pipes per cooling rated capacity in a conventional system using R22.

In the air conditioning system (1) of the present embodiment, according to the cooling rated capacity, the gas side pipe (31) is formed by use of a pipe having the same diameter as the aforesaid R22 gas side pipe, whereas the liquid side pipe (32) is formed by use of a pipe having a diameter smaller than that of the R22 liquid side pipe.

Figure 8:
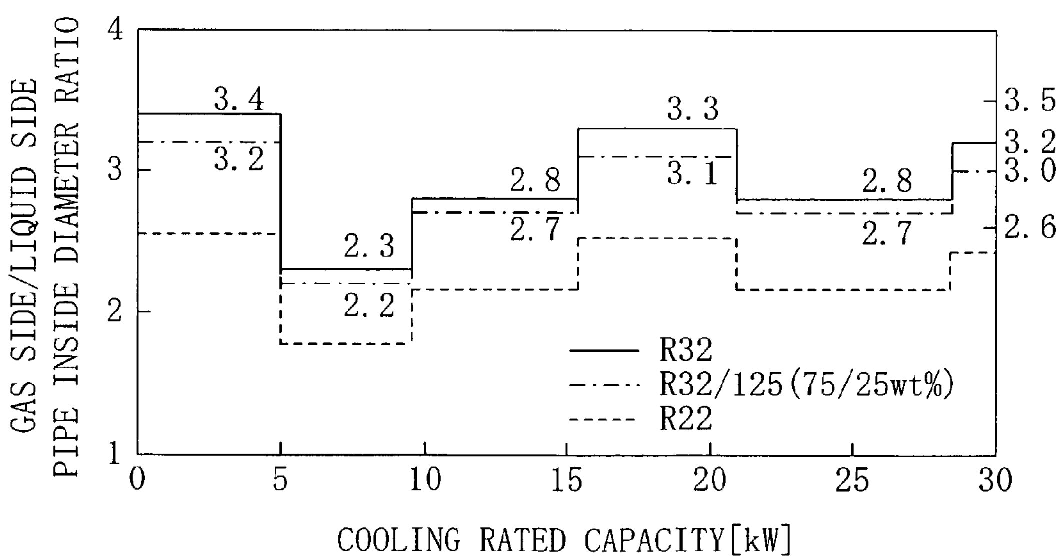
FIG. 8 is a diagram showing the reduced diameter ratio of a gas side pipe to a liquid side pipe with respect to the cooling rated capacity.

FIG. 8 is a diagram showing the ratio of the inside diameter dg of a gas side pipe to the inside diameter dl of a liquid side pipe, i.e., the inside diameter ratio (=the gas side pipe inside diameter dg/the liquid side pipe inside diameter dl). In the air conditioning system (1) of the present embodiment, according to the cooling rated capacity, the gas side pipe (31) and the liquid side pipe (32) having the following inside diameter ratios are used.

That is, if the cooling rated capacity is greater than 5 kW but not more than 9 kW, such a combination of the gas side pipe (31) and the liquid side pipe (32) that the inside diameter ratio is in the range 2.1 to 3.5, is used. If the cooling rated capacity is not more than 5 kW or more than 9 kW, such a combination of the gas side pipe (31) and the liquid side pipe (32) that the inside diameter ratio is in the range 2.6 to 3.5, is used.

Further, if the cooling rated capacity is not more than 5 kW, the liquid side pipe (32) is formed by use of a pipe whose inside diameter is in the range of 3.2 mm to 4.2 mm. If the cooling rated capacity is greater than 5 kW but less than 22.4 kW, the liquid side pipe (32) is formed by use of a pipe whose inside diameter is in the range of 5.4 mm to 7.0 mm. If the cooling rated capacity is not less than 22.4 kW, the liquid side pipe (32) is formed by use of a pipe whose inside diameter is in the range of 7.5 mm to 9.8 mm.

If the inside diameter ratio or the inside diameter of the liquid side pipe (32) falls below the aforesaid numerical value range, there is a drop in the system performance, although the refrigerant charging amount is further reduced. On the other hand, the inside diameter ratio or the inside diameter of the liquid side pipe (32) exceeds the aforesaid numerical value range, the effect of reducing the charging amount of refrigerant diminishes, although the refrigerant pressure loss is reduced and the system performance is therefore improved.

To cope with the above problem, in the present embodiment the inside diameters of the gas side pipe (31) and the liquid side pipe (32) are set to fall in the aforesaid numerical value ranges so that the refrigerant charging amount is sufficiently reduced while maintaining the system performance.

In order to more effectively make utilization of the characteristics of the R32, there may, of course, be made further restrictions on the numerical value ranges, depending upon the system use condition or other conditions.

For example, if the cooling rated capacity is greater than 5 kW but not more than 9 kW, the inside diameter ratio may be so restricted as to fall in the range of 2.4 to 3.2. If the cooling rated capacity is not more than 5 kW or more than 9 kW, the inside diameter ratio may be so restricted as to fall in the range of 2.8 to 3.3.

Further, if the cooling rated capacity is greater than 5 kW but not more than 9 kW, the inside diameter ratio may be so restricted as to fall in the range from 2.6 to 3.0. If the cooling rated capacity is not more than 5 kW or more than 9 kW, the inside diameter ratio may be so restricted as to fall in the range of 2.9 to 3.1.

Further, the inside diameter of the liquid side pipe (32) may be so set as to fall in the range of 3.5 mm to 3.9 mm if the cooling rated capacity is not more than 5 kW. If the cooling rated capacity is greater than 5 kW but less than 22.4 kW, the inside diameter of the liquid side pipe (32) may be so set as to fall in the range of 5.7 mm to 6.7 mm. If the cooling rated capacity is not less than 22.4 kW, the inside diameter of the liquid side pipe (32) may be so set as to fall in the range of 7.8 mm to 9.5 mm.

Further, the inside diameter of the liquid side pipe (32) may be so set as to fall in the range of 3.6 mm to 3.8 mm if the cooling rated capacity is not more than 5 kW. If the cooling rated capacity is greater than 5 kW but less than 22.4 kW, the inside diameter of the liquid side pipe (32) may be so set as to fall in the range of 6.0 mm to 6.4 mm. If the cooling rated capacity is not less than 22.4 kW, the inside diameter of the liquid side pipe (32) may be so set as to fall in the range of 8.1 mm to 9.1 mm.

Copper pipes have been used as a refrigerant pipe in many cases because they are inexpensive and easy to handle. Since various standardized copper pipes are available, it is possible to reduce the cost of the refrigerant pipes (31, 32) by utilizing existing standardized articles. Accordingly, for the purpose of reducing the system cost, both the liquid side pipe (32) and the gas side pipe (31) are preferably formed by combining only standardized articles so that the aforesaid inside diameter ratios are achieved.

Figures 9, 10:
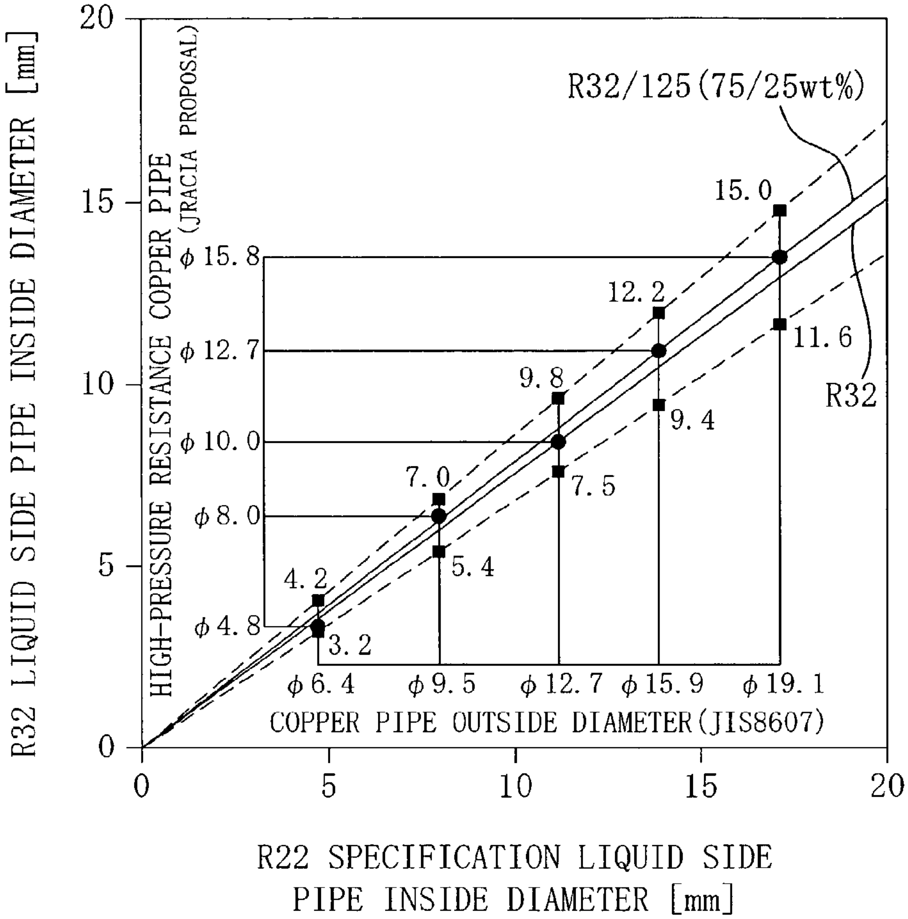
FIG. 9 is a diagram showing an R22 copper pipe versus R32 copper pipe relationship.
FIG. 10 is a table showing global warming potentials.

FIG. 9 is a diagram for the purpose of comparing the specification of an R22 copper pipe (JISB8607) and that of an R32 high-pressure resistance pipe according to a proposal by Japanese Refrigeration Air Conditioning Industrial Association.

For the case of the R32 single refrigerant, its best inside diameter ratio calculated from the aforesaid calculation results is 0.76, whereas, for the case of the R32/R125 mixed refrigerant whose R32 content is 75 wt. %, its best inside diameter ratio is 0.80. FIG. 9 shows that the inside diameter ratios can be realized easily by combinations of standardized articles, if within ±10% of the best inside diameter ratios.

For example, instead of using an R22 standardized pipe of $\phi$9.5 mm, a standardized pipe of $\phi$8.0 mm can be used if R32 is used. The present embodiment is an embodiment capable of being implemented easily by combinations of standardized articles.

Operation of the Air Conditioning System

The operation of the air conditioning system (1) will be described based on the refrigerant circulation operation of the refrigerant circuit (10).

During cooling mode operations, the four-way selector valve (12) is set as indicated by a solid line of FIG. 1. That is, the four-way selector valve (12) is placed in such a state that the first port (12*a*) is brought into communication with the second port (12*b*) while the third port (12*c*) is brought into communication with the second port (12*d*).

In such a state, gas refrigerant discharged out of the compressor (11), after flowing through the first gas side pipe (21), the four-way selector valve (12), and the second gas side pipe (22), condenses to change to liquid refrigerant in the outdoor heat exchanger (13). The liquid refrigerant, after flowing out of the outdoor heat exchanger (13), flows through the first liquid side pipe (25) and is depressurized in the expansion valve (14) to change to gas-liquid two-phase refrigerant. The two-phase refrigerant, after flowing out of the expansion valve (14), flows through the second liquid side pipe (26). Thereafter, the two-phase refrigerant exchanges heat with indoor air in the indoor heat exchanger (15) and evaporates to change to gas refrigerant, whereby the indoor air is cooled. The gas refrigerant, after flowing out of the indoor heat exchanger (15), flows through the third gas side pipe (23), the four-way selector valve (12), and the fourth gas side pipe (24) and thereafter is drawn into the compressor (11).

On the other hand, during heating mode operations, the four-way selector valve (12) is set as indicated by a broken line of FIG. 1. That is, the four-way selector valve (12) is placed in such a state that the first port (12*a*) is brought into communication with the fourth port (12*d*) while the second port (12*d*) is brought into communication with the third port (12*c*).

In such a state, gas refrigerant discharged out of the compressor (11), after flowing through the first gas side pipe (21), the four-way selector valve (12), and the third gas side pipe (23), enters the indoor heat exchanger (15). The refrigerant, which has flowed into the indoor heat exchanger (15), exchanges heat with indoor air in the indoor heat exchanger (15) and condenses to change to liquid refrigerant, whereby the indoor air is heated. The liquid refrigerant, after flowing out of the indoor heat exchanger (15), flows through the second liquid side pipe (26) and is depressurized in the expansion valve (14) to change to gas-liquid two-phase refrigerant. The two-phase refrigerant, after flowing out of the expansion valve (14), flows through the first liquid side pipe (25) and evaporates to change to gas refrigerant in the outdoor heat exchanger (13). The gas refrigerant, after flowing out of the outdoor heat exchanger (13), flows through the second gas side pipe (22), the four-way selector valve (12), and the fourth gas side pipe (24) and thereafter is drawn into the compressor (11).

Effects of the Embodiment

As described above, in the present embodiment, either an R32 single refrigerant or an R32/R125 mixed refrigerant is used as a refrigerant and, in addition, the heat transfer pipes of the outdoor heat exchanger (13) and the indoor heat exchanger (15) and the liquid side pipe (32) each have a further reduction in diameter than conventional. Therefore, in accordance with the present embodiment, it is possible to reduce the internal volume of the refrigerant circuit (10) while maintaining the system performance, and it is possible to suppress contamination, e.g., moisture contamination and the like, which is introduced into the refrigerant circuit (10).

As a result of the above arrangement, the hydrolysis of an extreme pressure additive which is added to the refrigeration oil can be prevented, and it is possible to prevent the drop in lubricity. Particularly, deteriorated substances hydrolyzed will not be deposited in the form of a sludge in the expansion valve (14), thereby making it possible to prevent clogging of the flowpath of the refrigerant circuit (10) without fail.

Further, it is possible to prevent generation of corrosive substances such as hydrochloric acid in an extreme pressure additive of the chlorine family.

Furthermore, since the possibility that the refrigerant circuit (10) is contaminated with air and other contaminants is small, this facilitates manufacture and install control, thereby making it possible to provide improvements in manufacture ease and installation ease.

Further, the use of a synthetic oil as a refrigeration oil makes it possible to provide improvements in system reliability. In other words, circuit clogging due to the deposition of a sludge is unlikely to occur even when a synthetic oil is used as a refrigeration oil, thereby enhancing the reliability of the system. Furthermore, since the possibility of the refrigerant circuit (10) being contaminated with air and other contaminants is small, this makes it possible to relax quality control procedures during manufacture and installation.

Further, since the internal volume of the refrigerant circuit (10) becomes smaller, this makes it possible to reduce the amount of charging refrigerant. Therefore, the effect of global warming can be reduced. Further, by virtue of the reduction in heat transfer pipe diameter, the cost of the outdoor and indoor heat exchangers (13) and (15) can be lowered and the compacting of the outdoor and indoor heat exchangers (13) and (15) can be achieved. Therefore, it becomes possible to reduce the indoor unit (17) and the outdoor unit (16) in size.

Further, it is possible to prevent the deterioration of insulating materials used in the electric motor of the compressor (11). This makes it possible to prevent the electric motor from burning out and to prevent the sliding part of the compressor (11) from undergoing abrasion and seizing. Further, the expansion valve (14) can be prevented from undergoing clogging or the like. Accordingly, it is possible to achieve a reduction in the fraction defective.

Other Embodiments of the Present Invention

In accordance with the present invention, it is, of course, possible to obtain an effect of reducing the internal volume of the refrigerant circuit (10) by reducing the diameter of both the gas side pipe (31) and the liquid side pipe (32). However, such an effect can be obtained by reducing only the diameter of the gas side pipe (31).

The gas side pipe (31) which is subjected to reduction in diameter may be all of the first gas side pipe (21), the second gas side pipe (22), the third gas side pipe (23), and the fourth gas side pipe (24) or some of these gas side pipes. Likewise, the liquid side pipe (32) which is subjected to reduction in diameter may be both the first liquid side pipe (25) and the second liquid side pipe (26) or one of these liquid side pipes.

On the basis of R22 liquid side pipe values different from those shown in FIG. 7, the diameter (inside or outside diameter) of the liquid side pipe (32) may be so set as to become smaller than them.

More specifically, the liquid side pipe (32) may be formed by use of a pipe whose diameter is less than 4.75 mm, when the cooling rated capacity is not more than 5 kW.

Further, the liquid side pipe (32) may be formed by use of a pipe whose diameter is less than 7.92 mm, when the cooling rated capacity is greater than 5 kW but not more than 18 kW.

Further, the liquid side pipe (32) may be formed by use of a pipe whose diameter is less than 11.1 mm, when the cooling rated capacity is greater than 18 kW but not more than 22.4 kW.

Further, the liquid side pipe (32) may be formed by use of a pipe whose diameter is less than 13.88 mm, when the cooling rated capacity is greater than 22.4W.

On the basis of R22 gas side pipe values different from those shown in FIG. 7, the diameter of the gas side pipe (31) may be so set as to become smaller than them.

More specifically, the gas side pipe (31) may be formed by use of a pipe whose diameter is less than 7.92 mm, when the cooling rated capacity is not more than 3.2 kW.

Further, the gas side pipe (31) may be formed by use of a pipe whose diameter is less than 11.1 mm, when the cooling rated capacity is greater than 3.2 kW but not more than 5 kW.

Further, the gas side pipe (31) may be formed by use of a pipe whose diameter is less than 13.88 mm, when the cooling rated capacity is greater than 5 kW but not more than 9 kW.

Further, the gas side pipe (31) may be formed by use of a pipe whose diameter is less than 17.05 mm, when the cooling rated capacity is greater than 9 kW but not more than 18 kW.

Further, the gas side pipe (31) may be formed by use of a pipe whose diameter is less than 23.4 mm, when the cooling rated capacity is greater than 18 kW but not more than 22.4 kW.

Further, the gas side pipe (31) may be formed by use of a pipe whose diameter is less than 26.18 mm, when the cooling rated capacity is greater than 22.4 kW.

On the basis of R22 heat transfer pipe values, the diameter of the heat transfer pipe of each of the indoor heat exchanger (15) and the outdoor heat exchanger (13) may be so set as to become smaller than them.

More specifically, the heat transfer pipe of the indoor heat exchanger (15) may be formed by use of a pipe whose inside diameter is less than 5.87 mm.

Further, the heat transfer pipe of the outdoor heat exchanger (13) may be formed by use of a pipe whose inside diameter is less than 6.89 mm.

Further, the heat transfer pipe of the outdoor heat exchanger (13) may be formed by use of a pipe whose inside diameter is less than 7.99 mm.

The above-described embodiment is intended for air conditioning systems of a so-called heat pump type capable of selectively performing cooling or heating mode operations. However, the applicability of the present invention is not limited to such a heat pump type air conditioning system. For example, the present invention is applicable to cooling-only air conditioning systems. Further, the present invention is made applicable to heating-only air conditioning systems by setting the inside diameter of both the liquid side pipe (32) and the gas side pipe (31) per heating rated capacity corresponding to a cooling rated capacity or by setting their inside diameter ratio.

Further, by "cooling rated capacity" used in the aforesaid embodiment is meant an evaporator capacity. This cooling rated capacity is not limited to the capacity of an air conditioning system during cooling mode operations. The cooling rated capacity is a capacity which is exhibited under given JIS conditions (e.g., indoor dry-bulb temperature: 27 degrees Centigrade; outdoor wet-bulb temperature: 19 degrees Centigrade; and outdoor dry-bulb temperature: 35 degrees Centigrade) where the length of a connection pipe is 5 m and the difference in level between an indoor unit and an outdoor unit is 0 m.

Neither the gas side pipe (31) nor the liquid side pipe (32) is necessarily formed by use of a copper pipe and these pipes may of course be formed of any other pipe such as a SUS pipe, an aluminum pipe, an iron pipe, or the like.

The outdoor heat exchanger (13) and the indoor heat exchanger (15) are not limited to air heat exchangers and they may be liquid-liquid heat exchangers such as a heat exchanger of the double pipe type.

The refrigeration system of the present invention is not limited to refrigeration systems in a restricted sense. That is, the refrigeration system of the present invention includes refrigeration systems in a wide sense such as a refrigerator and a dehumidifier, not to mention air conditioning systems.

When the present invention is applied to a refrigeration system capable of accommodating long piping or to a refrigeration system provided with a plurality of indoor units, it is possible to extend the allowable length of piping. Furthermore, in accordance with the present invention, the number of indoor units can be increased. Accordingly, it becomes possible to provide improvements in system handling ease as well as in commodity property.

When the present invention is applied to a machine capable of accommodating long piping or to a machine capable of accommodating a plurality of indoor units, it is possible to provide an extended allowable piping length. Furthermore, the present invention enables the number of indoor units to increase. Accordingly, it becomes possible to provide improvements in system handling ease as well as in commodity property.

INDUSTRIAL APPLICABILITY

As has been described above, the refrigeration system of the present invention is useful for cases utilizing either an R32 single refrigerant or an R32/R125 mixed refrigerant, and the present invention is suitable particularly for a refrigeration system utilizing an extreme pressure additive.

What is claimed is:

1. A refrigeration system whose cooling rated capacity is not more than 5 kW, said refrigeration system comprising a refrigerant circuit (10) which forms a refrigeration cycle in which either a single refrigerant of R32 or a mixed refrigerant whose R32 content is not less than 75% is used as a refrigerant and includes a compressor (11) which utilizes a refrigeration oil having an addition of an extreme pressure additive, wherein said refrigerant circuit (10) includes a liquid side pipe (32) which is formed by use of a pipe whose inside diameter is less than 4.75 mm.

2. A refrigeration system whose cooling rated capacity is not more than 5 kW, said refrigeration system comprising a refrigerant circuit (10) which forms a refrigeration cycle in which either a single refrigerant of R32 or a mixed refrigerant whose R32 content is not less than 75% is used as a refrigerant and includes a compressor (11) which utilizes a refrigeration oil having an addition of an extreme pressure additive, wherein said refrigerant circuit (10) includes a liquid side pipe (32) which is formed by use of a pipe whose inside diameter ranges from 3.2 mm to 4.2 mm.

3. A refrigeration system whose cooling rated capacity is not more than 5 kW, said refrigeration system comprising a refrigerant circuit (10) which forms a refrigeration cycle in which either a single refrigerant of R32 or a mixed refrigerant whose R32 content is not less than 75% is used as a refrigerant and includes a compressor (11) which utilizes a refrigeration oil having an addition of an extreme pressure additive, wherein said refrigerant circuit (10) includes a liquid side pipe (32) which is formed by use of a pipe whose inside diameter ranges from 3.5 mm to 3.9 mm.

4. A refrigeration system whose cooling rated capacity is not more than 5 kW, said refrigeration system comprising a refrigerant circuit (10) which forms a refrigeration cycle in which either a single refrigerant of R32 or a mixed refrigerant whose R32 content is not less than 75% is used as a refrigerant and includes a compressor (11) which utilizes a refrigeration oil having an addition of an extreme pressure additive, wherein said refrigerant circuit (10) includes a liquid side pipe (32) which is formed by use of a pipe whose inside diameter ranges from 3.6 mm to 3.8 mm.

5. A refrigeration system whose cooling rated capacity is greater than 5 kW but not more than 18 kW, said refrigeration system comprising a refrigerant circuit (10) which forms a refrigeration cycle in which either a single refrigerant of R32 or a mixed refrigerant whose R32 content is not less than 75% is used as a refrigerant and includes a compressor (11) which utilizes a refrigeration oil having an addition of an extreme pressure additive, wherein said refrigerant circuit (10) includes a liquid side pipe (32) which is formed by use of a pipe whose inside diameter is less than 7.92 mm.

6. A refrigeration system whose cooling rated capacity is greater than 18 kW but not more than 22.4 kW, said refrigeration system comprising a refrigerant circuit (10) which forms a refrigeration cycle in which either a single refrigerant of R32 or a mixed refrigerant whose R32 content is not less than 75% is used as a refrigerant and includes a compressor (11) which utilizes a refrigeration oil having an addition of an extreme pressure additive, wherein said refrigerant circuit (10) includes a liquid side pipe (32) which is formed by use of a pipe whose inside diameter is less than 11.1 mm.

7. A refrigeration system whose cooling rated capacity is greater than 5 kW but not more than 22.4 kW, said refrigeration system comprising a refrigerant circuit (10) which forms a refrigeration cycle in which either a single refrigerant of R32 or a mixed refrigerant whose R32 content is not less than 75% is used as a refrigerant and includes a compressor (11) which utilizes a refrigeration oil having an addition of an extreme pressure additive, wherein said refrigerant circuit (10) includes a liquid side pipe (32) which is formed by use of a pipe whose inside diameter ranges from 5.4 mm to 7.0 mm.

8. A refrigeration system whose cooling rated capacity is greater than 5 kW but not more than 22.4 kW, said refrigeration system comprising a refrigerant circuit (10) which forms a refrigeration cycle in which either a single refrigerant of R32 or a mixed refrigerant whose R32 content is not less than 75% is used as a refrigerant and includes a compressor (11) which utilizes a refrigeration oil having an addition of an extreme pressure additive, wherein said refrigerant circuit (10) includes a liquid side pipe (32) which is formed by use of a pipe whose inside diameter ranges from 5.7 mm to 6.7 mm.

9. A refrigeration system whose cooling rated capacity is greater than 5 kW but not more than 22.4 kW, said refrigeration system comprising a refrigerant circuit (10) which forms a refrigeration cycle in which either a single refrigerant of R32 or a mixed refrigerant whose R32 content is not less than 75% is used as a refrigerant and includes a compressor (11) which utilizes a refrigeration oil having an addition of an extreme pressure additive, wherein said refrigerant circuit (10) includes a liquid side pipe (32) which is formed by use of a pipe whose inside diameter ranges from 6.0 mm to 6.4 mm.

10. A refrigeration system whose cooling rated capacity is so designed as to be greater than 22.4 kW, said refrigeration system comprising a refrigerant circuit (10) which forms a refrigeration cycle in which either a single refrigerant of R32 or a mixed refrigerant whose R32 content is not less than 75% is used as a refrigerant and includes a compressor (11) which utilizes a refrigeration oil having an addition of an extreme pressure additive, wherein said refrigerant circuit (10) includes a liquid side pipe (32) which is formed by use of a pipe whose inside diameter is less than 13.88 mm.

11. A refrigeration system whose cooling rated capacity is so designed as to be greater than 22.4 kW, said refrigeration system comprising a refrigerant circuit (10) which forms a refrigeration cycle in which either a single refrigerant of R32 or a mixed refrigerant whose R32 content is not less than 75% is used as a refrigerant and includes a compressor (11) which utilizes a refrigeration oil having an addition of an extreme pressure additive, wherein said refrigerant circuit (10) includes a liquid side pipe (32) which is formed by use of a pipe whose inside diameter ranges from 7.5 mm to 9.8 mm.

12. A refrigeration system whose cooling rated capacity is so designed as to be greater than 22.4 kW, said refrigeration system comprising a refrigerant circuit (10) which forms a refrigeration cycle in which either a single refrigerant of R32 or a mixed refrigerant whose R32 content is not less than 75% is used as a refrigerant and includes a compressor (11) which utilizes a refrigeration oil having an addition of an extreme pressure additive, wherein said refrigerant circuit (10) includes a liquid side pipe (32) which is formed by use of a pipe whose inside diameter ranges from 7.8 mm to 9.5 mm.

13. A refrigeration system whose cooling rated capacity is so designed as to be greater than 22.4 kW, said refrigeration system comprising a refrigerant circuit (10) which forms a refrigeration cycle in which either a single refrigerant of R32 or a mixed refrigerant whose R32 content is not less than 75% is used as a refrigerant and includes a compressor (11) which utilizes a refrigeration oil having an addition of an extreme pressure additive, wherein said refrigerant circuit (10) includes a liquid side pipe (32) which is formed by use of a pipe whose inside diameter ranges from 8.1 mm to 9.1 mm.

14. A refrigeration system whose cooling rated capacity is not more than 3.2 kW, said refrigeration system comprising a refrigerant circuit (10) which forms a refrigeration cycle in which either a single refrigerant of R32 or a mixed refrigerant whose R32 content is not less than 75% is used as a refrigerant and includes a compressor (11) which utilizes a refrigeration oil having an addition of an extreme pressure additive, wherein said refrigerant circuit (10) includes a gas side pipe (31) which is formed by use of a pipe whose inside diameter is less than 7.92 mm.

15. A refrigeration system whose cooling rated capacity is greater than 3.2 kW but not more than 5 kW, said refrigeration system comprising a refrigerant circuit (10) which forms a refrigeration cycle in which either a single refrigerant of R32 or a mixed refrigerant whose R32 content is not less than 75% is used as a refrigerant and includes a compressor (11) which utilizes a refrigeration oil having an addition of an extreme pressure additive, wherein said refrigerant circuit (10) includes a gas side pipe (31) which is formed by use of a pipe whose inside diameter isle than 11.1 mm.

16. A refrigeration system whose cooling rated capacity is greater than 5 kW but not more than 9 kW, said refrigeration system comprising a refrigerant circuit (10) which forms a refrigeration cycle in which either a single refrigerant of R32 or a mixed refrigerant whose R32 content is not less than 75% is used as a refrigerant and includes a compressor (11) which utilizes a refrigeration oil having an addition of an extreme 10 pressure additive, wherein said refrigerant circuit (10) includes a gas side pipe (31) which is formed by use of a pipe whose inside diameter is less than 13.88 mm.

17. A refrigeration system whose cooling rated capacity is greater than 9 kW but not more than 18 kW, said refrigeration system comprising a refrigerant circuit (10) which forms a refrigeration cycle in which either a single refrigerant of R32 or a mixed refrigerant whose R32 content is not less than 15% is used as a refrigerant and includes a compressor (11) which utilizes a refrigeration oil having an addition of an extreme pressure additive, wherein said refrigerant circuit (10) includes a gas side pipe (31) which is formed by use of a pipe whose inside diameter is less than 17.05 mm.

18. A refrigeration system whose cooling rated capacity is greater than 18 kW but not more than 22.4 kW, said refrigeration system comprising a refrigerant circuit (10) which forms a refrigeration cycle in which either a single refrigerant of R32 or a mixed refrigerant whose R32 content is not less than 75% is used as a refrigerant and includes a compressor (11) which utilizes a refrigeration oil having an addition of an extreme pressure additive, wherein said refrigerant circuit (10) includes a gal side pipe (31) which is formed by use of a pipe whose inside diameter is less than 23.4 mm.

19. A refrigeration system whose cooling rated capacity is so designed to be greater than 22.4 kW, said refrigeration system comprising a refrigerant circuit (10) which forms a refrigeration cycle in which either a single refrigerant of R32 or a mixed refrigerant whose R32 content is not less than 75% is used as a refrigerant and includes a compressor (11) which utilizes a refrigeration oil having an addition of an extreme pressure additive, wherein said refrigerant circuit (10) includes a gas side pipe (31) which is formed by use of a pipe whose inside diameter is less than 26.18 mm.

20. A refrigeration system comprising a refrigerant circuit (10) which includes (a) a compressor (11) which utilizes a refrigeration oil having an addition of an extreme pressure additive and (b) an indoor heat exchanger (15) and forms a refrigeration cycle in which either a single refrigerant of R32 or a mixed refrigerant whose R32 content is not less than 75% is used as a refrigerant, wherein said indoor heat exchanger (15) includes a heat transfer pipe which is formed by use of a heat transfer pipe whose inside diameter is less than 5.87 mm.

21. A refrigeration system comprising a refrigerant circuit (10) which includes (a) a compressor (11) which utilizes a refrigeration oil having an addition of an extreme pressure additive and (b) an outdoor heat exchanger (13) and forms a refrigeration cycle in which either a single refrigerant of R32 or a mixed refrigerant whose R32 content is not less than 75% is used as a refrigerant, wherein said outdoor heat exchanger (13) includes a heat transfer pipe which is formed by use of a heat transfer pipe whose inside diameter is less than 6.89 mm.

22. A refrigeration system comprising a refrigerant circuit (10) which includes (a) a compressor (11) which utilizes a refrigeration oil having an addition of an extreme pressure additive and (b) an outdoor heat exchanger (13) and forms a refrigeration cycle in which either a single refrigerant of R32 or a mixed refrigerant whose R32 content is not less than 75% is used as a refrigerant, wherein said outdoor heat exchanger (13) includes a heat transfer pipe which is formed by use of a heat transfer pipe whose inside diameter is less than 7.99 mm.

23. The refrigeration system of any one of claims 1–22, wherein said compressor (11) uses a synthetic oil as a refrigeration oil.

24. The refrigeration system of any one of claims 1–13, wherein said liquid side pipe (32) is a liquid side connecting pipe for connecting an indoor unit (17) and an outdoor unit (16).

25. The refrigeration system of any one of claims 1–19, wherein said gas side pipe (31) is a gas side connecting pipe for connecting an indoor unit (17) and an outdoor unit (16).

26. The refrigeration system of any one of claims 1–22, wherein said mixed refrigerant is an R32/R125 mixed refrigerant.

27. The refrigeration system of any one of claims 1–22, wherein said refrigerant is a single refrigerant of R32.

* * * * *

UNITED STATES PATENT AND TRADEMARK OFFICE

CERTIFICATE OF CORRECTION

PATENT NO. : 6,971,244 B2

APPLICATION NO. : 10/257919
DATED : December 6, 2005
INVENTOR(S) : Nobuo Domyo

It is certified that error appears in the above-identified patent and that said Letters Patent is hereby corrected as shown below:

Title Page

(54) "REFRIGERATOR" should read --REFRIGERATION SYSTEM--; and

Claim 18, column 22, line 46, "gal" should read --gas--.

Signed and Sealed this

Twenty-fourth Day of June, 2008

JON W. DUDAS
*Director of the United States Patent and Trademark Office*

UNITED STATES PATENT AND TRADEMARK OFFICE

CERTIFICATE OF CORRECTION

PATENT NO. : 6,971,244 B2
APPLICATION NO. : 10/257919
DATED : December 6, 2005
INVENTOR(S) : Nobuo Domyo It is certified that error appears in the above-identified patent and that said Letters Patent is hereby corrected as shown below:

Title Page

(54) and Column 1, line 1 “REFRIGERATOR” should read --REFRIGERATION SYSTEM--; and Claim 18, column 22, line 46, “gal” should read --gas--.

This certificate supersedes the Certificate of Correction issued June 24, 2008.

Signed and Sealed this

Twenty-second Day of July, 2008

JON W. DUDAS
*Director of the United States Patent and Trademark Office*